United States Patent
Kwon et al.

(10) Patent No.: US 12,198,019 B2
(45) Date of Patent: Jan. 14, 2025

(54) APPARATUS AND METHOD FOR TRAINING REINFORCEMENT LEARNING MODEL FOR USE IN COMBINATORIAL OPTIMIZATION

(71) Applicant: SAMSUNG SDS CO., LTD., Seoul (KR)

(72) Inventors: Yeong Dae Kwon, Seoul (KR); Jin Ho Choo, Seoul (KR); Il Joo Yoon, Seoul (KR); Byoung Jip Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 1120 days.

(21) Appl. No.: 17/077,204

(22) Filed: Oct. 22, 2020

(65) Prior Publication Data
US 2021/0374604 A1 Dec. 2, 2021

(30) Foreign Application Priority Data

Jun. 2, 2020 (KR) .......................... 10-2020-0066379

(51) Int. Cl.
*G06N 20/00* (2019.01)
(52) U.S. Cl.
CPC .................................... *G06N 20/00* (2019.01)
(58) Field of Classification Search
USPC ..................................................... 706/12, 45
See application file for complete search history.

(56) References Cited

PUBLICATIONS

Alipour, et al., A Hybrid Algorithm Using a Genetic Algorithm and Multiagent Reinforcement Learning Heuristic to Solve the Traveling Salesman Problem, Neural Computing & Applications, vol. 30, 2018, pp. 2935-2951 (Year: 2018).*
Wu, et al., Peekaboo: Learning-based Multipath Scheduling for Dynamic Heterogeneous Environments, IEEE Journal on Selected Areas in Communications, vol. 38, Issue 10, Oct. 2020, pp. 2295-2310 (Year: 2020).*

* cited by examiner

*Primary Examiner* — Wilbert L Starks
(74) *Attorney, Agent, or Firm* — Sughrue Mion, PLLC

(57) ABSTRACT

An apparatus for training a reinforcement learning model according to an embodiment includes a starting point determinator configured to determine starting points from an input value of a combinatorial optimization problem, a multi-explorer configured to generate exploration trajectories by performing exploration from each of the starting points using a reinforcement learning model, a trajectory evaluator configured to calculate an evaluation value of each of the exploration trajectories using an evaluation function of the combinatorial optimization problem, a baseline calculator configured to calculate a baseline for the input value from the evaluation value of each exploration trajectory, an advantage calculator configured to calculate an advantage of each of the exploration trajectories using the evaluation value of each exploration trajectory and the baseline, and a parameter updater configured to update parameters of the reinforcement learning model by using the exploration trajectories and the advantages of each exploration trajectory.

15 Claims, 14 Drawing Sheets

APPARATUS AND METHOD FOR TRAINING REINFORCEMENT LEARNING MODEL FOR USE IN COMBINATORIAL OPTIMIZATION

CROSS-REFERENCE TO RELATED APPLICATION(S)

This application claims the benefit under 35 U.S.C. § 119(a) of Korean Patent Application No. 10-2020-0066379, filed on Jun. 2, 2020, in the Korean Intellectual Property Office, the entire disclosure of which is incorporated herein by reference for all purposes.

BACKGROUND

1. Field

The following description relates to combinatorial optimization using reinforcement learning.

2. Description of Related Art

Combinatorial optimization problem is intended to find an optimal solution to obtain the minimum or maximum value of an objective function composed of a number of independent variables. Typical combinatorial optimization problems are the traveling salesman problem (TSP), the knapsack problem (KP), and the vehicle routing problem (VRP).

There are several ways to solve the combinatorial optimization problems, but recently, a method using reinforcement learning has been studied. Reinforcement learning, which is one of machine learning methods, is intended to learn which action is best to take in the current state through trials and errors. Each time an action is taken, a reward is given from an external environment, and learning proceeds in the direction of maximizing the reward.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for effectively training a reinforcement learning model in combinatorial optimization using reinforcement learning.

In one general aspect, there is provided an apparatus for training a reinforcement learning model including a starting point determinator configured to determine a plurality of starting points from an input value of a combinatorial optimization problem, a multi-explorer configured to generate a plurality of exploration trajectories by performing exploration from each of the plurality of starting points using a reinforcement learning model, a trajectory evaluator configured to calculate an evaluation value of each of the plurality of exploration trajectories using an evaluation function of the combinatorial optimization problem, a baseline calculator configured to calculate a baseline for the input value from the evaluation value of each exploration trajectory, an advantage calculator configured to calculate an advantage of each of the exploration trajectories using the evaluation value of each exploration trajectory and the baseline, and a parameter updater configured to update parameters of the reinforcement learning model by using the plurality of exploration trajectories and the advantages of each exploration trajectory.

The starting point determinator may infer an optimal trajectory for all starting point candidates available from the input value by using the reinforcement learning model and determine the plurality of starting points among the starting point candidates based on an inference value of each of the starting point candidates.

The evaluation value of each of the plurality of exploration trajectories may be calculated as a sum of rewards computed for each of the plurality of exploration trajectories.

The baseline calculator may calculate the baseline using one of an average and median value of the evaluation values of the plurality of respective exploration trajectories, an evaluation value of a specific ranking, an average of evaluation values of a specific ranking or higher, and a median value of evaluation values of a specific ranking or higher.

The advantage calculator may calculate the advantage of each exploration trajectory by subtracting the baseline from the evaluation value of each of the plurality of exploration trajectories.

The apparatus may further include an input value extender configured to generate one or more extended input values from the input value, wherein the one or more extended input values are generated by modifying the input value such that an evaluation value of an optimal solution of the extended input value is equal to an evaluation value of an optimal solution of the input value.

The starting point determinator may receive the input value and the extended input values at the same time and generate a plurality of starting points from the received values and the baseline calculator may receive an evaluation value of each exploration trajectory derived from the input value and an evaluation value of each exploration trajectory derived from the extended input value and calculate one baseline from the received evaluation values.

The starting point determinator may simultaneously receive a plurality of different input values and generate a plurality of starting points from the received input values and the baseline calculator may calculate a plurality of different baselines for the different respective input values.

In another general aspect, there is provided an apparatus for training a reinforcement learning model including a multi-explorer configured to generate a plurality of candidate exploration trajectories from all starting point candidates available from an input value of a combinatorial optimization problem by performing exploration from each of all the starting point candidates, a trajectory evaluator configured to calculate an evaluation value of each of the plurality of candidate exploration trajectories using an evaluation function of the combinatorial optimization problem, a starting point determinator configured to determine a plurality of starting points for the input value by using the evaluation value of each of the plurality of candidate exploration trajectories, a baseline calculator configured to calculate a baseline for the input value from evaluation values of a plurality of exploration trajectories that correspond to the plurality of respective starting points, an advantage calculator configured to calculate an advantage of each of the plurality of exploration trajectories using the evaluation values of each of the plurality of exploration trajectories and the baseline, and a parameter updater configured to update parameters of the reinforcement learning model by using the plurality of exploration trajectories and the advantages of each exploration trajectory.

The evaluation value of each of the plurality of exploration trajectories may be calculated as a sum of rewards computed for each of the plurality of exploration trajectories.

The baseline calculator may calculate the baseline using one of an average and median value of the evaluation values of the plurality of respective exploration trajectories, an evaluation value of a specific ranking, an average of evaluation values of a specific ranking or higher, and a median value of evaluation values of a specific ranking or higher.

The advantage calculator may calculate the advantage of each exploration trajectory by subtracting the baseline from the evaluation value of each of the plurality of exploration trajectories.

The apparatus may further include an input value extender configured to generate one or more extended input values from the input value, wherein the one or more extended input values are generated by modifying the input value such that an evaluation value of an optimal solution of the extended input value is equal to an evaluation value of an optimal solution of the input value.

The multi-explorer may receive the input value and the extended input values at the same time and generate a plurality of candidate exploration trajectories from the received input values and the baseline calculator may receive an evaluation value of each exploration trajectory derived from the input value and an evaluation value of each exploration trajectory derived from the extended input value and calculate one baseline from the received evaluation values.

The multi-explorer may simultaneously receive a plurality of different input values and generate a plurality of candidate exploration trajectories from the received input values and the baseline calculator may calculate a plurality of different baselines for the different respective input values.

In still another general aspect, there is provided a method of training a reinforcement learning model, which is performed by a computing device that includes one or more processors and memory storing one or more programs to be executed by the one or more processors, the method including determining a plurality of starting points from an input value of a combinatorial optimization problem, generating a plurality of exploration trajectories by performing exploration from each of the plurality of starting points using a reinforcement learning model, calculating an evaluation value of each of the plurality of exploration trajectories using an evaluation function of the combinatorial optimization problem, calculating a baseline for the input value from the evaluation value of each exploration trajectory, calculating an advantage of each of the exploration trajectories using the evaluation value of each exploration trajectory and the baseline, and updating parameters of the reinforcement learning model by using the plurality of exploration trajectories and the advantage of each exploration trajectory.

In yet another general aspect, there is provided a method of training a reinforcement learning model, which is performed by a computing device that includes one or more processors and memory storing one or more programs to be executed by the one or more processors, the method including generating a plurality of candidate exploration trajectories from all starting point candidates available from an input value of a combinatorial optimization problem by performing exploration from each of all the starting point candidates, calculating an evaluation value of each of the plurality of candidate exploration trajectories using an evaluation function of the combinatorial optimization problem, determining a plurality of starting points for the input value by using the evaluation value of each of the plurality of candidate exploration trajectories, calculating a baseline for the input value from evaluation values of a plurality of exploration trajectories that correspond to the plurality of respective starting points, calculating an advantage of each of the plurality of exploration trajectories using the evaluation values of each of the plurality of exploration trajectories and the baseline, and updating parameters of the reinforcement learning model by using the plurality of exploration trajectories and the advantages of each exploration trajectory.

Other features and aspects will be apparent from the following detailed description, the drawings, and the claims.

Figure 1:
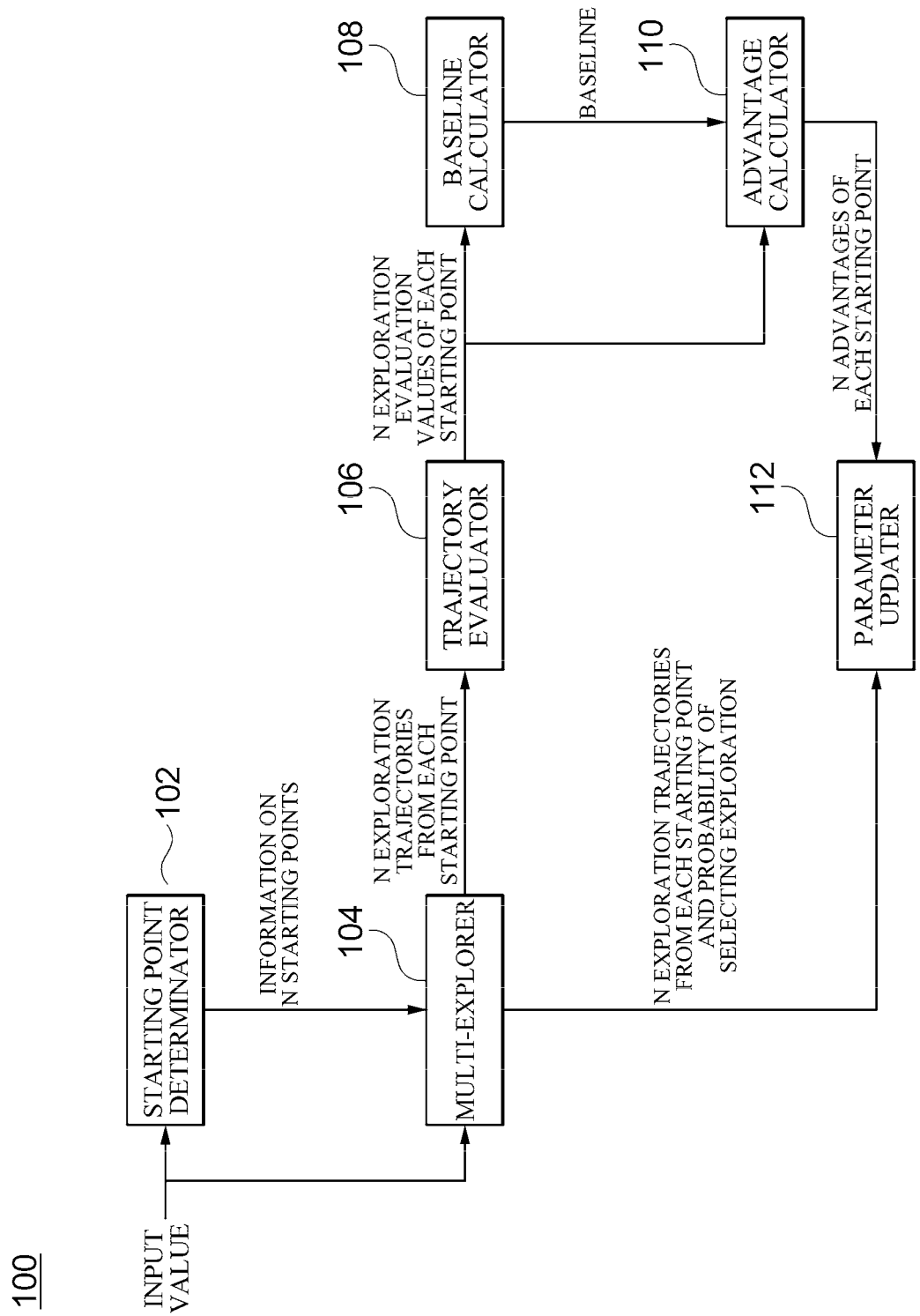
FIG. 1 is a block diagram illustrating an apparatus for training a reinforcement learning model according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made based on the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating an apparatus for training a reinforcement learning model according to a first embodiment. As illustrated, the apparatus 100 for training a reinforcement learning model according to the first embodiment includes a starting point determinator 102, a multi-explorer 104, a trajectory evaluator 106, a baseline calculator 108, an advantage calculator 110, and a parameter updater 112.

The starting point determinator 102 determines a plurality of exploration starting points (hereinafter referred to as "starting points") from an input value of a combinatorial optimization problem. In the disclosed embodiments, the input value of the combinatorial optimization problem may consist of L elements (L is a natural number greater than or equal to 1). For example, when the combinatorial optimization problem is the traveling salesman problem, the input value may have coordinate information of L cities around which a salesman travels as elements. The starting point determinator 102 may be configured to determine N starting points (N is a natural number greater than or equal to 1 and N<=1) from the input value including the L elements.

In one embodiment, the starting point determinator 102 may infer an optimal trajectory using a reinforcement learning model for all starting point candidates available from the input value, and determine the plurality of starting points among the starting point candidates based on an inference value of each starting point candidate, which will be described in more detail below.

Figure 2:
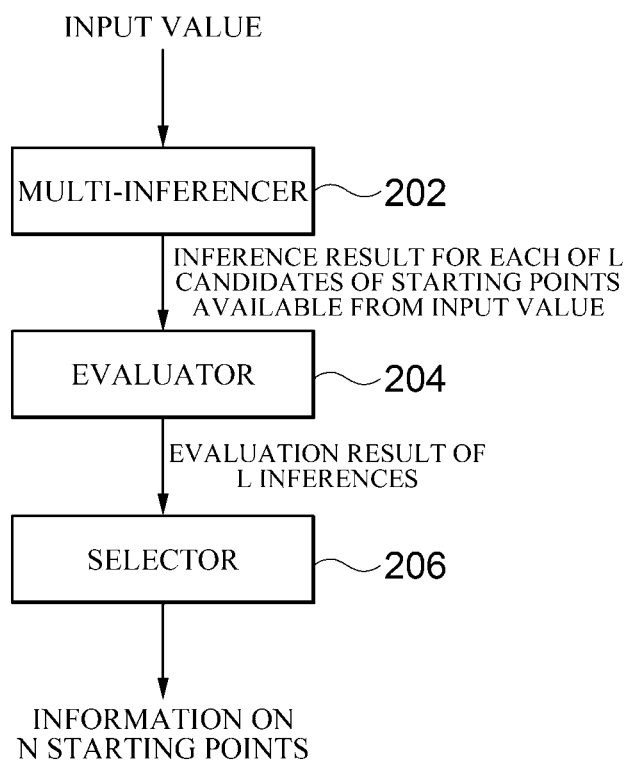
FIG. 2 is a block diagram illustrating in more detail a starting point determinator according to the first embodiment.

FIG. 2 is a block diagram illustrating in more detail the starting point determinator 102 according to the first embodiment. As illustrated, the starting point determinator 102 according to the first embodiment includes a multi-inferencer 202, an evaluator 204, and a selector 206.

The multi-inferencer 202 infers an optimal trajectory for each of all starting point candidates available from the input value. For example, when the input value includes L elements, the multi-inferencer may set each of the L elements as a starting point candidate and generate an inference result of an optimal trajectory for each of the starting point candidate. In this case, the multi-inferencer 202 may generate the inference result of an optimal trajectory using a reinforcement learning model.

The evaluator 204 evaluates each inference trajectory of each starting point candidate generated by the multi-inferencer 202 to calculate an evaluation value of each inference trajectory. In one embodiment, the evaluator 204 may calculate an evaluation value of each of the plurality of inference trajectories using an evaluation function of the combinatorial optimization problem. If the multi-inferencer 202 generates the inference result of the optimal trajectory of each of the L starting point candidates, the evaluator 204 may calculate L evaluation values.

The selector 206 selects N starting points based on the evaluation values calculated by the evaluator 204. In one embodiment, the selector 206 may be configured to select N starting points in the order of higher to lower evaluated value calculated by the evaluator 204.

Meanwhile, in another embodiment, the starting point determinator 102 may select N starting points in a way different from the way described above. For example, the starting point determinator 102 may arbitrarily select N starting points from the L starting point candidates, or select the N starting points using a separate starting point selection algorithm that is dependent on the combinatorial optimization problem to be solved. Also, according to an embodiment, the starting point determinator 102 may select the L possible starting point candidates as the starting points.

Figure 3:
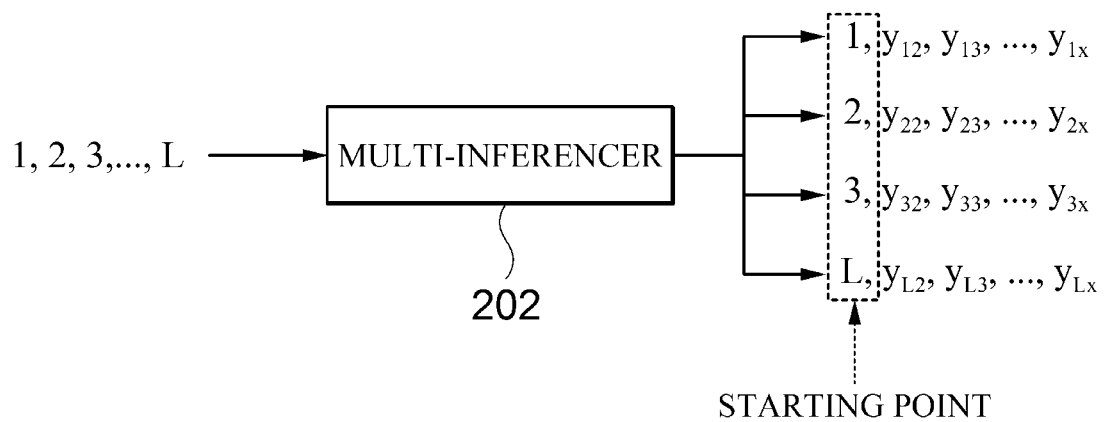
FIG. 3 is an exemplary diagram illustrating input and output of a multi-inferencer according to one embodiment.
Figure 4:
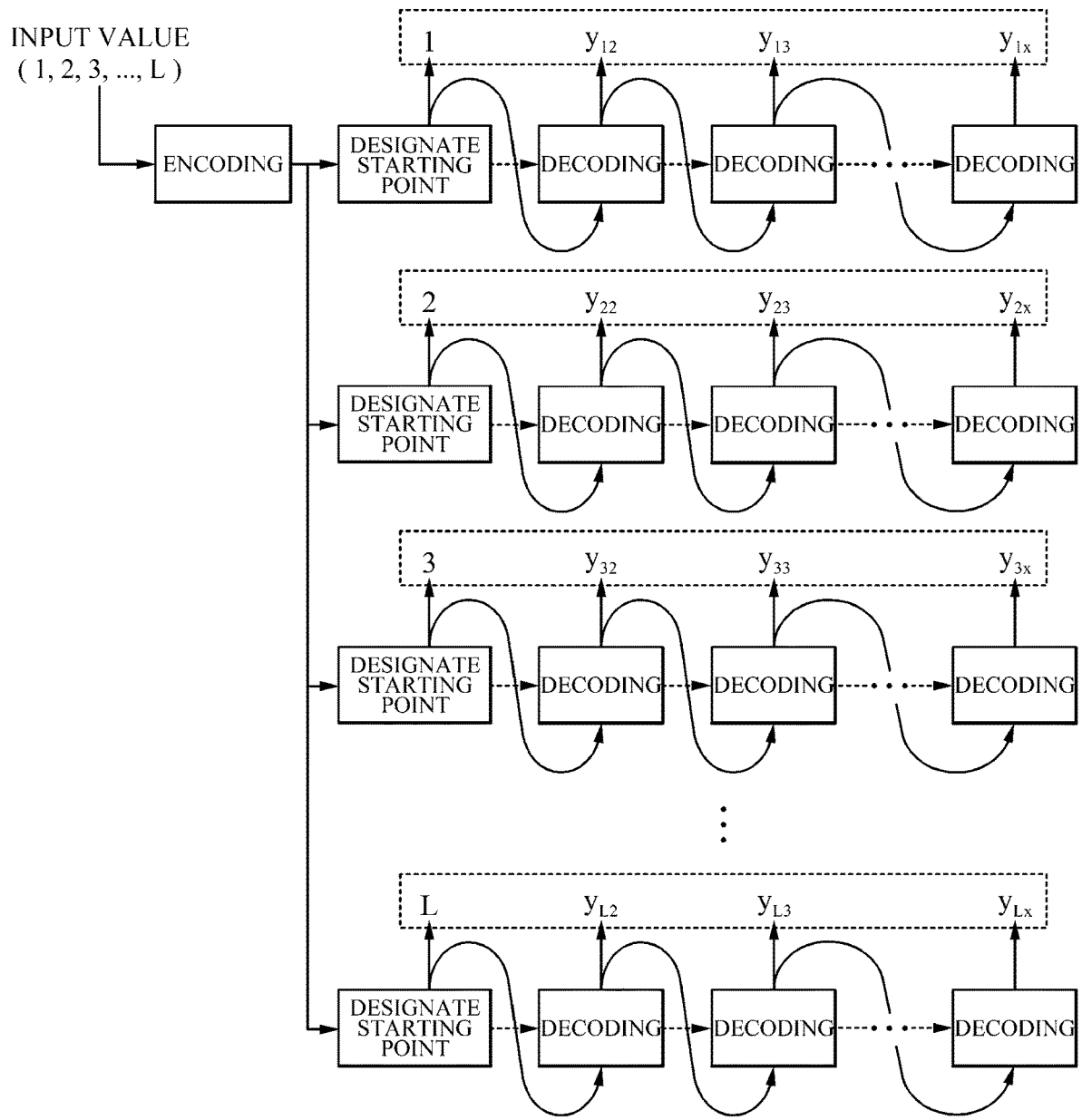
FIG. 4 is a block diagram illustrating an optimal trajectory inference process in the multi-inferencer according to one embodiment.

FIGS. 3 and 4 are diagrams for describing in more detail the multi-inferencer 202 according to one embodiment. First, FIG. 3 is an exemplary diagram illustrating input and output of the multi-inferencer 202 according to one embodiment. As illustrated, for an input value $(1, 2, 3, \ldots, L)$ consisting of L elements, the multi-inferencer 202 may generate L optimal trajectory inference results using each of the L elements as a starting point candidate. According to an embodiment, the multi-inferencer 202 may sequentially generate the inference results for each starting point candidate, or may simultaneously perform a plurality of inferences in parallel.

FIG. 4 is a block diagram illustrating an optimal trajectory inference process in the multi-inferencer 202 according to one embodiment. As described above, the multi-inferencer 202 may perform the optimal trajectory inference using the reinforcement learning model. In this case, the reinforcement learning model may include an encoder network and a decoder network. The multi-inferencer 202 encodes the input value $(1, 2, 3, \ldots, L)$ using the encoder network, and then acquires L inference results by performing decoding using the decoder network for each starting point candidate. In the illustrated embodiment, k, $y_{k2}$, $y_{k3}$, . . . , and $y_{kx}$ represent the optimal trajectory inference result when an element k ($1<=k<=L$) of the input value is used as a starting point.

Returning back to FIG. 1, the multi-explorer 104 performs exploration from each of a plurality (N) of starting points determined by the starting point determinator 102 using the reinforcement learning model, thereby generating a plurality of exploration trajectories.

Figure 5:
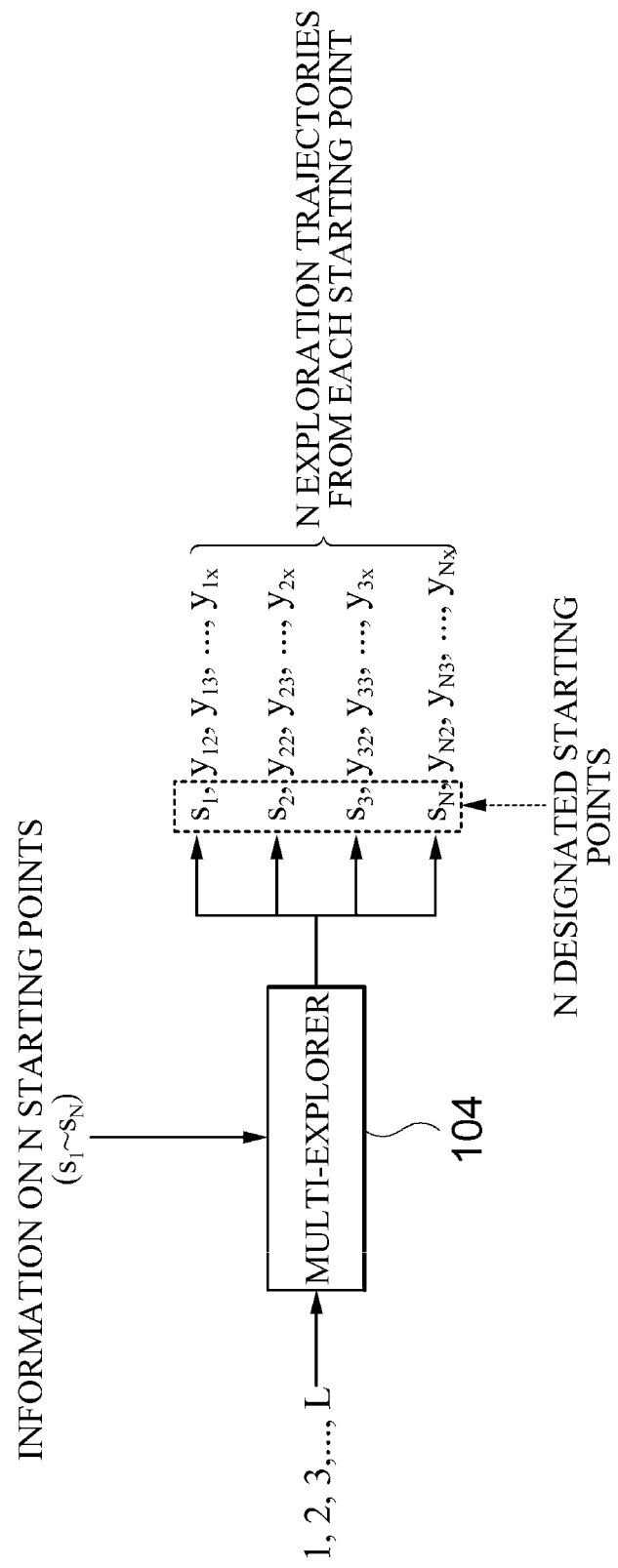
FIG. 5 is an exemplary diagram illustrating input and output of a multi-explorer according to one embodiment.
Figure 6:
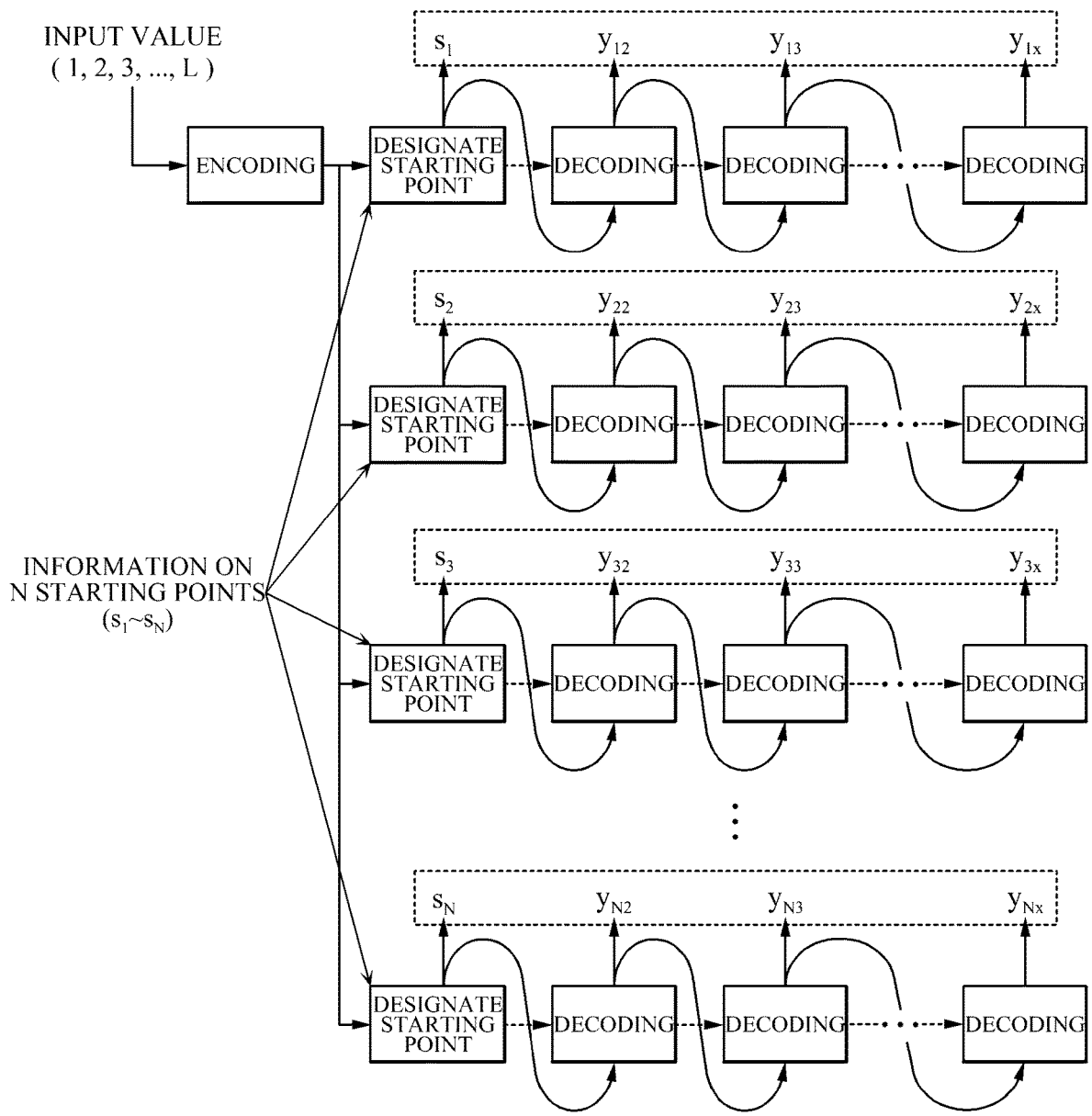
FIG. 6 is a block diagram illustrating a process of generating an exploration trajectory in the multi-explorer according to one embodiment.

FIGS. 5 and 6 are diagrams for describing in more detail the multi-explorer 104 according to one embodiment. First, FIG. 5 is an exemplary diagram illustrating input and output of the multi-explorer 104 according to one embodiment. As illustrated, the multi-explorer 104 receives an input value $(1, 2, 3, \ldots, L)$ consisting of L elements and information on N starting points $s_1$ to $s_N$ determined by the starting point determinator 102, and generates N exploration trajectories from the received respective starting points. According to an embodiment, the multi-explorer 104 may sequentially generate the exploration trajectories from each starting point, or may simultaneously generate a plurality of exploration trajectories in parallel.

FIG. 6 is a block diagram illustrating a process of generating an exploration trajectory in the multi-explorer 104.

As described above, the multi-explorer 104 may generate the exploration trajectories using a reinforcement learning model as in the multi-inferencer 202. In detail, the multi-explorer 104 may encodes the input value $(1, 2, 3, \ldots, L)$ using an encoder network and then acquires L exploration trajectories by performing decoding using a decoder network for each starting point. In the illustrated embodiment, $s_k, y_{k2}, y_{k3}, \ldots$ and $y_{kx}$ represent an exploration trajectory when an element k $(1<=k<=N)$ of the input value is used as a starting point. The difference between the exploration trajectory generation process of the multi-explorer 104 and the optimal trajectory inference process of the multi-inferencer 202 is that the optimal trajectory inference process always outputs only a result value that expects the reinforcement learning model to receive the maximum reward under a given condition whereas the exploration trajectory is not necessarily limited to the trajectory that expects the maximum reward.

Returning back to FIG. 1, the trajectory evaluator 106 may calculates an evaluation value of each of the plurality of exploration trajectories generated by the multi-explorer 104. In one embodiment, the trajectory evaluator 106 may generate the evaluated value using an evaluation function of the input combinatorial optimization problem. In this case, the evaluation value of each exploration trajectory may be calculated as a total reward that is a sum of rewards computed through the evaluation function in the process of generating each exploration trajectory. Specifically, the evaluation value of each exploration trajectory may be calculated by Equation 1 below.

$$\text{total\_reward}_i = R(\text{trajectory}_i) \quad \text{[Equation 1]}$$

Here, total_reward$_i$ is an evaluation value of the $i^{th}$ exploration trajectory, trajectory$_i$ is the $i^{th}$ exploration trajectory, and R is an evaluation function of an input combinatorial optimization problem.

The baseline calculator 108 calculates a baseline for the input value from the evaluation value of each exploration trajectory. In the disclosed embodiments, the baseline calculator 108 is configured to calculate one baseline for each input value. In one embodiment, the baseline calculator 108 may calculate the baseline using one of an average and median value of the evaluation values of the plurality of respective exploration trajectories, an evaluation value of a specific ranking, an average of evaluation values of a specific ranking or higher, and the median value of evaluation values of a specific ranking or higher.

The advantage calculator 110 calculates an advantage of each exploration trajectory using the evaluation value of each exploration trajectory and the baseline. The advantage calculator 110 may calculate the advantage of each exploration trajectory by subtracting the baseline from the evaluation value of each of the plurality of exploration trajectories. In the disclosed embodiments, the exploration trajectory-specific advantage indicates how high the evaluation was made on each exploration result compared to the baseline. One advantage is calculated for each exploration trajectory. Specifically, the advantage calculator 110 may calculate the advantage for each exploration trajectory by Equation 2 below.

$$\text{advantage}_i = \text{total\_reward}_i - \text{baseline} \quad \text{[Equation 2]}$$

Here, advantage$_i$ is an advantage of the $i^{th}$ exploration trajectory.

A parameter updater 112 updates parameters of the reinforcement learning model using the plurality of exploration trajectories and the exploration trajectory-specific advantages. A detailed method of updating the reinforcement learning model is well known to those of ordinary skill in the art, and thus a detailed description thereof will be omitted herein.

Figure 7:
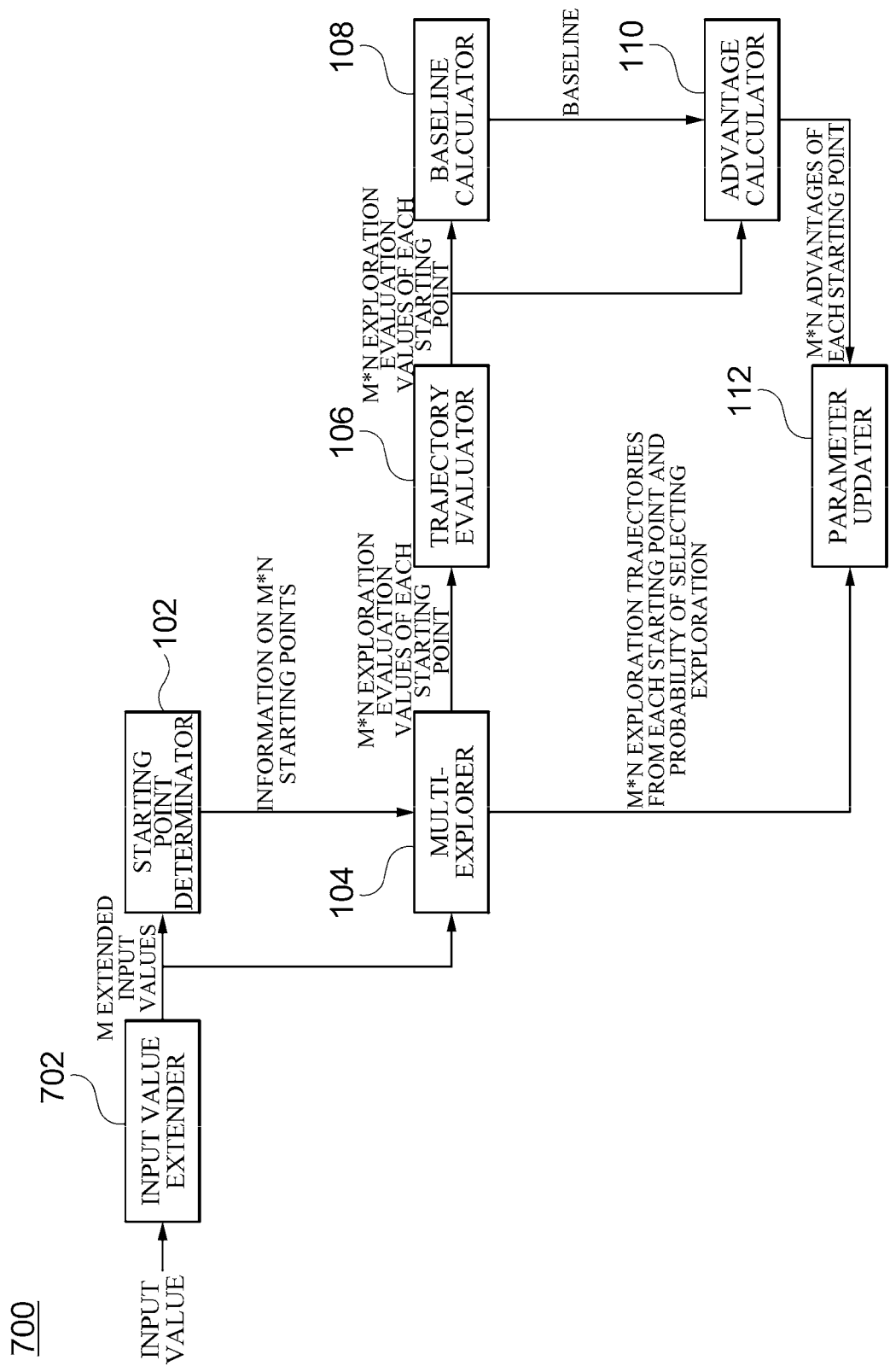
FIG. 7 is a block diagram illustrating an apparatus for training a reinforcement learning model according to a second embodiment.

FIG. 7 is a block diagram illustrating an apparatus for training a reinforcement learning mode according to a second embodiment. In the present embodiment and the following embodiments, blocks performing the same functions as those in the above embodiments are denoted by the same reference numerals and redundant descriptions thereof will be omitted.

The apparatus 700 for training a reinforcement learning model according to the second embodiment is different from that of the first embodiment in that it further includes an input value extender 702. The input value extender 702 receives an input value of a combinatorial optimization problem and generates one or more extended input values from the received input value. In one embodiment, the input value extender 702 may generate the one or more extended input values by modifying the input value such that an evaluated value of the optimal solution of the extended input value is equal to an evaluate value of the optimal solution of the original input value. For example, the input value extender 702 may generate the extended input value by changing the order of the elements constituting the input value, or by transforming, rotating, or inverting coordinate axes of each element.

If the input value extender 702 generates M extended input values from one input value, a starting point determinator 102 may determine N starting points for each of the extended input values, i.e., a total of M*N starting points, and a multi-explorer 104 may generate M*N exploration trajectories. Thereafter, a trajectory evaluator 106 generates M*N exploration trajectory-specific evaluation values, and a baseline calculator 108 calculates one baseline from the M*N evaluation values. Then, an advantage calculator 110 calculates exploration trajectory-specific advantages relative to the same baseline, and a parameter updater 112 updates the parameters of the reinforcement learning model using the calculated advantages.

Figure 8:
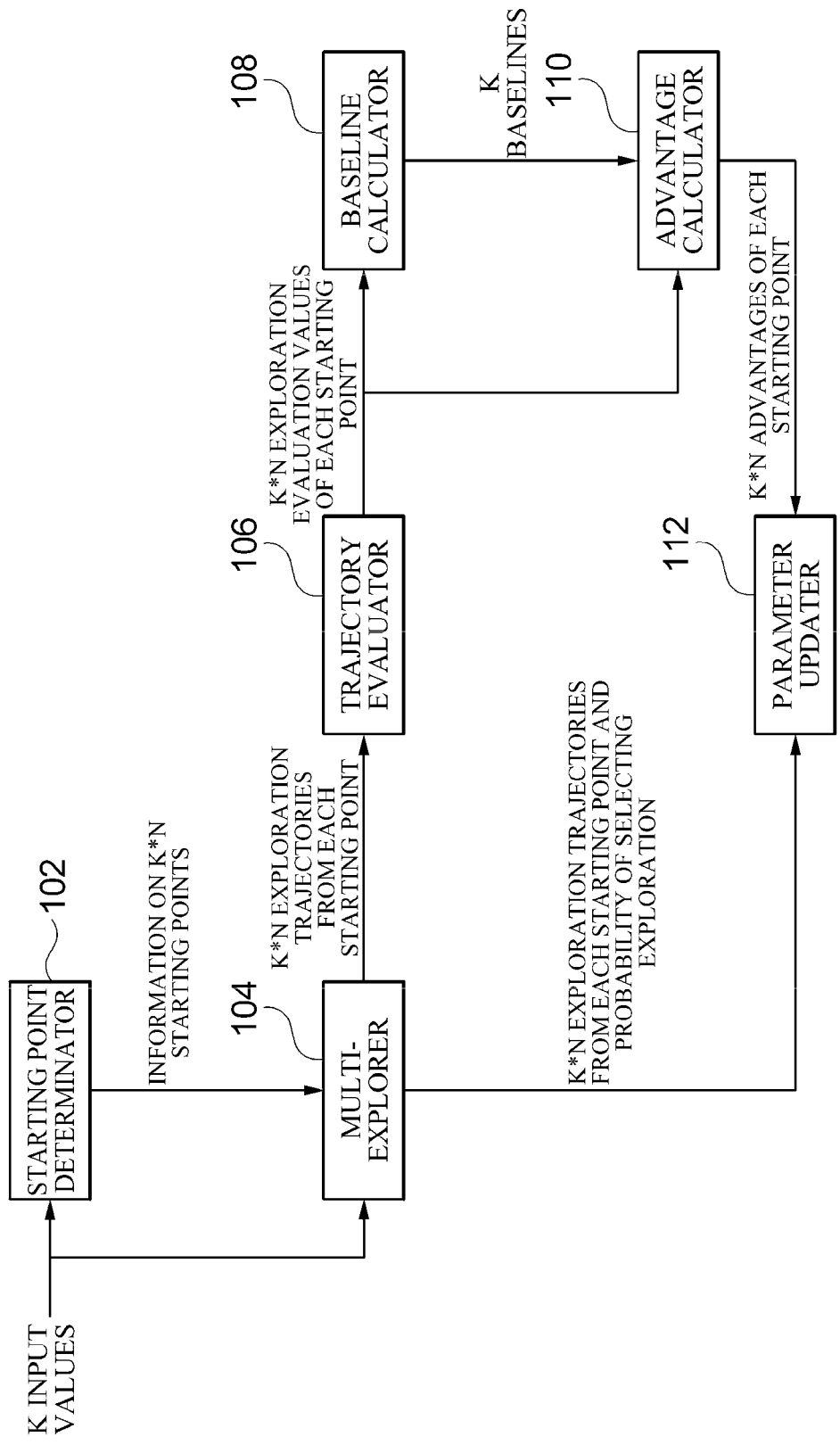
FIG. 8 is a block diagram illustrating an apparatus for training a reinforcement learning model according to a third embodiment.

FIG. 8 is a block diagram illustrating an apparatus 800 for training a reinforcement learning model according to a third embodiment. The apparatus 800 for training a reinforcement learning model according to the third embodiment is different from those of the above-described embodiments in that it does not receive one input value, but simultaneously receives K input values in a mini-batch form. If the size of the mini-batch is K, K input values can be simultaneously learned.

If the K input values are simultaneously input, a starting point determinator 102 may determine N starting points for each input value, i.e., a total of K*N starting points, and a multi-explorer 104 may generate K*N exploration trajectories. Thereafter, a trajectory evaluator 106 generates K*N evaluation values of the exploration trajectories, and a baseline calculator 108 calculates K baselines for the respective input values from the K*N evaluation values. In other words, the baseline calculator 108 according to the present embodiment calculates a plurality of different baselines for the different respective input values. Then, an advantage calculator 110 calculates exploration trajectory-specific advantages relative to each of the calculated baselines, and a parameter updater 112 updates parameters of the reinforcement learning model using the calculated advantages.

Figure 9:
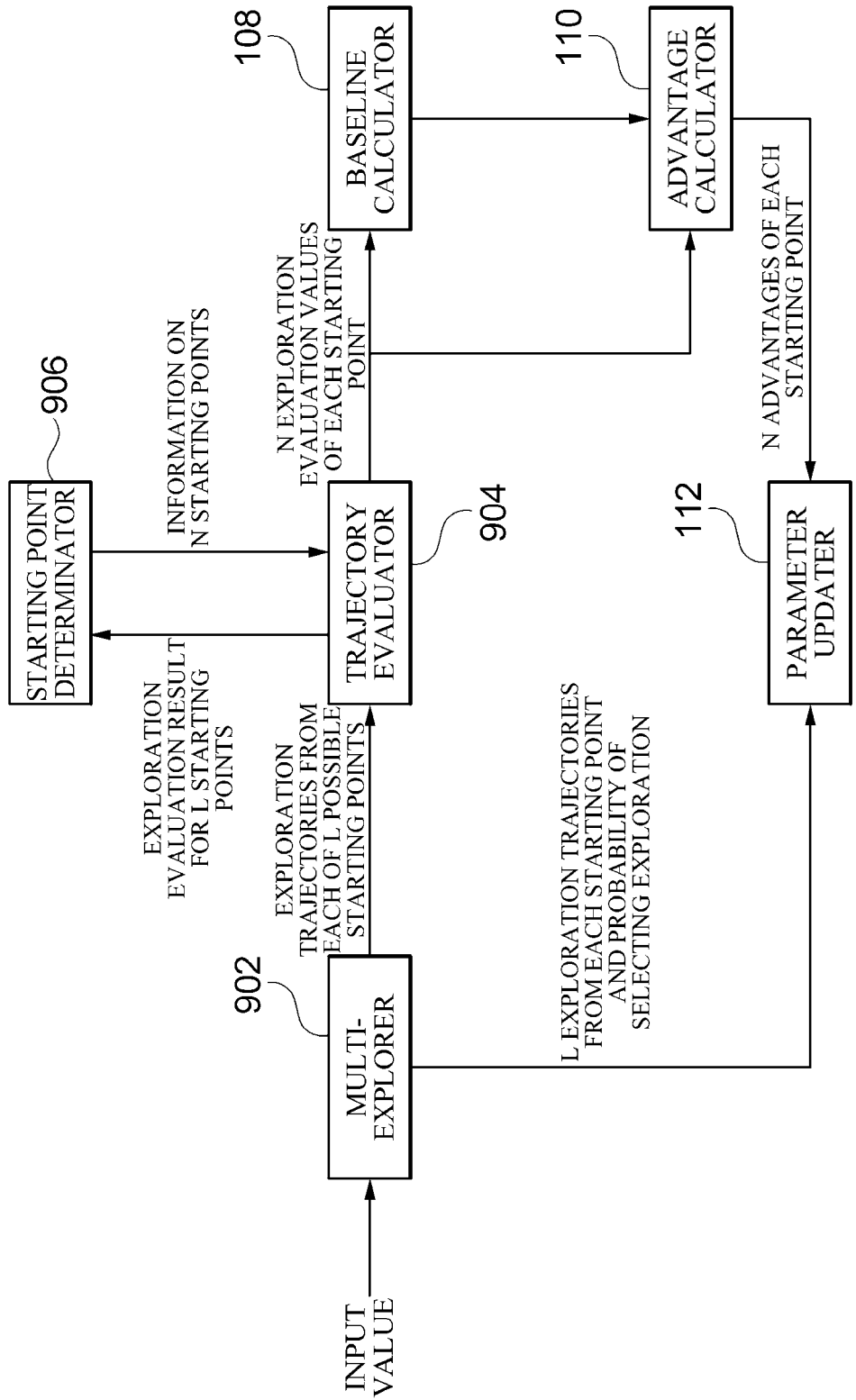
FIG. 9 is a block diagram illustrating an apparatus for training a reinforcement learning model according to a fourth embodiment.

FIG. 9 is a block diagram illustrating an apparatus 900 for training a reinforcement learning model according to a fourth embodiment. The apparatus 900 for training a reinforcement learning model according to the fourth embodiment is different from those of the above-described embodiments in that the apparatus 900 does not include the separate starting point determinator 102, and rather, after a multi-explorer 902 generates exploration trajectories from all possible starting points, a starting point determinator 906 determines N starting points by comparing exploration evaluation results of the respective exploration trajectories. Such differences are described in more detail below.

In the present embodiment, for all starting point candidates available from an input value of a combinatorial optimization problem, the multi-explorer 902 generates a plurality of candidate exploration trajectories by performing exploration from each of all the possible starting point candidates using a reinforcement learning model. If the input value includes L elements, the multi-explorer 902 generates L candidate exploration trajectories.

A trajectory evaluator 904 calculates an evaluation value of each of the L candidate exploration trajectories using an evaluation function of the combinatorial optimization problem. As in the above-described embodiments, the evaluation value of each candidate exploration trajectory may be calculated as a sum of rewards computed for each of the plurality of exploration trajectories.

The starting point determinator 906 determines a plurality (N) of starting points for the input value by using the evaluation values of the plurality of respective candidate exploration trajectories.

A baseline calculator 108 calculates a baseline for the input value from the evaluation values of the plurality of exploration trajectories that correspond to the N starting points, respectively. In one embodiment, the baseline calculator 108 may calculate the baseline using one of an average or median value of the evaluation values of the plurality of respective exploration trajectories, an evaluation value of a specific ranking, an average of evaluation values of a specific ranking or higher, or the median value of evaluation values of a specific ranking or higher.

An advantage calculator 110 computes an advantage of each of the N exploration trajectories using the evaluation value of each of the plurality (N) of exploration trajectories and the baseline. In this case, the advantage calculator 110 may compute the advantage of each exploration trajectory by subtracting the baseline from the evaluation value of each of the plurality of exploration trajectories.

A parameter updater 112 updates parameters of the reinforcement learning model using the plurality of exploration trajectories and the exploration trajectory-specific advantages.

In the present embodiment, the apparatus 900 may further include an input value extender (not shown) as in the above-described second embodiment. In this case, the input value extender may generate one or more extended input values from the input value by modifying the input value such that an evaluated value of the optimal solution of the extended input value is equal to an evaluated value of the optimal solution of the input value. In this case, the multi-explorer 902 may receive the input value and the extended input value at the same time and generate a plurality of candidate exploration trajectories from the received input value and extended input value, and the baseline calculator 108 may receive an evaluation value of each exploration trajectory derived from the input value and an evaluation value of each exploration trajectory derived from the extended input value and derive one baseline from the received evaluation values.

Also, the apparatus 900 according to the present embodiment may receive a plurality (K) of input values in a mini-batch form as in the above-described third embodiment. In this case, the multi-explorer 902 may generate a plurality (K) of candidate exploration trajectories from the K different input values, and the baseline calculator 108 may calculate a plurality (K) of different baselines for the respective different input values.

Figure 10:
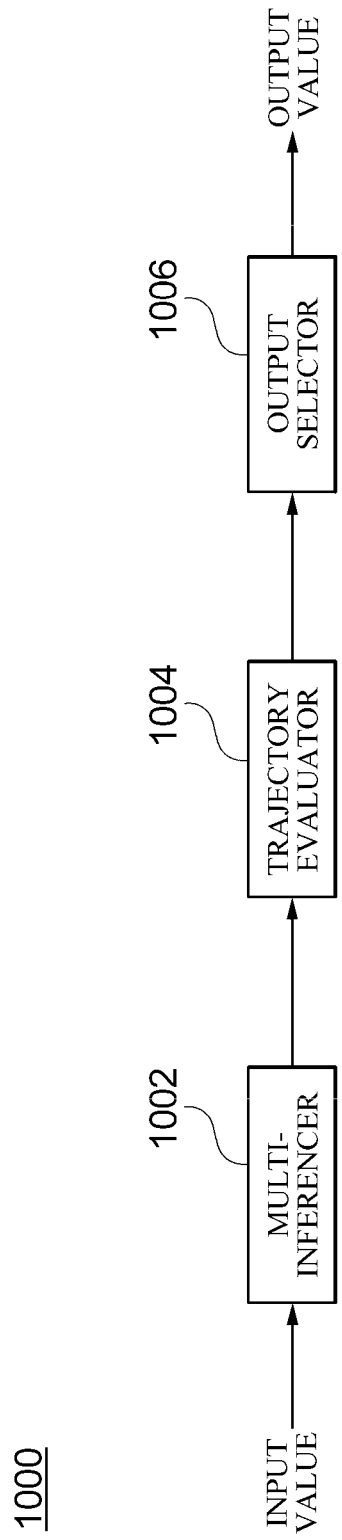
FIG. 10 is a block diagram illustrating an apparatus for inference using a reinforcement learning model according to one embodiment.

FIG. 10 is a block diagram illustrating an apparatus 1000 for inference using a reinforcement learning model according to one embodiment. The apparatus 1000 for inference using a reinforcement learning model according to one embodiment performs inference on a combinatorial optimization problem using the reinforcement learning model trained through the apparatus according to any one of the first to fourth embodiments. As illustrated, the apparatus 1000 for inferring using a reinforcement learning model according to one embodiment includes a multi-inferencer 1002, a trajectory evaluator 1004, and an output selector 1006.

The multi-inferencer 1002 infers an optimal trajectory for each of all starting points available from an input value. For example, when the input value includes L elements, the multi-inferencer 1002 may set each of the L elements as a starting point and generate an inference result of an optimal trajectory for each starting point.

The trajectory evaluator 1004 evaluates each inference trajectory of each starting point generated by the multi-inferencer 1002 to calculate an evaluation value of each inference trajectory. In one embodiment, the trajectory evaluator 1004 may calculate an evaluation value of each of the plurality of inference trajectories using an evaluation function of the combinatorial optimization problem.

The output selector 1006 selects the inference trajectory that has the highest ranking from the trajectory evaluator 1004 as a final output.

Figure 11:
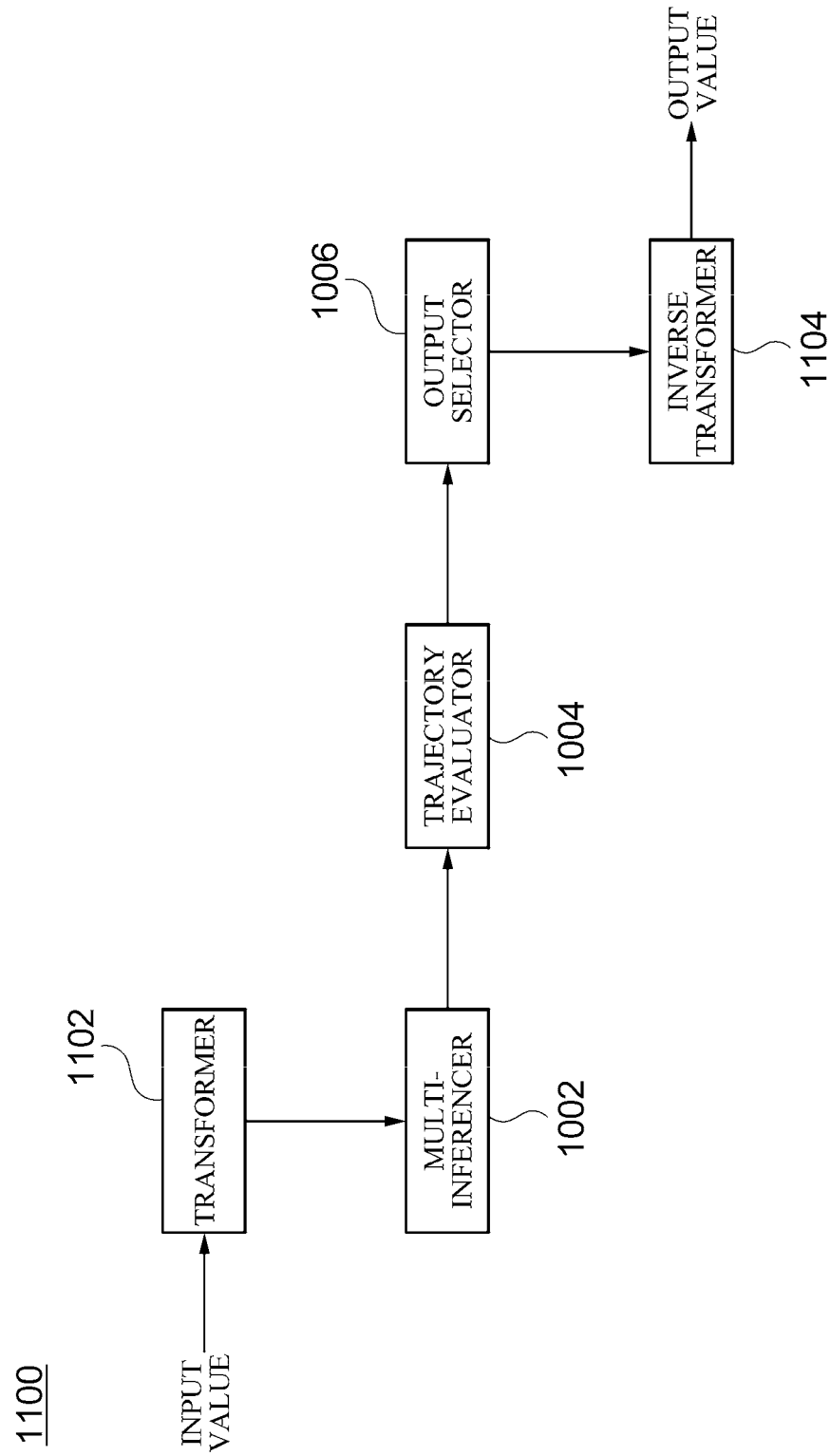
FIG. 11 is a block diagram illustrating an apparatus for inference using a reinforcement learning model according to another embodiment.

FIG. 11 is a block diagram illustrating an apparatus 1100 for inferring a reinforcement learning model according to another embodiment. The present embodiment is different from the above-described embodiment in that a transformer 1102 and an inverse transformer 1104 are further added to the apparatus illustrated in FIG. 10.

The transformer 1102 receives an input value of a combinatorial optimization problem and generates one or more extended input values from the received input value. In one embodiment, the transformer 1102 may generate the one or more extended input values by modifying the input value such that an evaluation value of the optimal solution of the extended input value is equal to an evaluation value of the optimal solution of the original input value. For example, the transformer 1102 may generate the extended input value by changing the order of the elements constituting the input value, or by transforming, rotating, or inverting coordinate axes of each element. In this case, a multi-inferencer 1002 infers an optimal trajectory for each of all possible starting points for each of the input values extended in the transformer 1102, and the trajectory evaluator 1004 evaluates each inference trajectory of each starting point generated by the multi-inferencer 1002 to calculate an evaluation value of each inference trajectory. The output selector 1006 selects the inference trajectory that has the highest ranking from the trajectory evaluator 1004 as a final output.

Finally, when the output result selected by the output selector 1006 is derived from an extended input, the inverse transformer 1104 reversely performs the transformation process of the transformer 1102 to generate a final output result.

Figure 12:
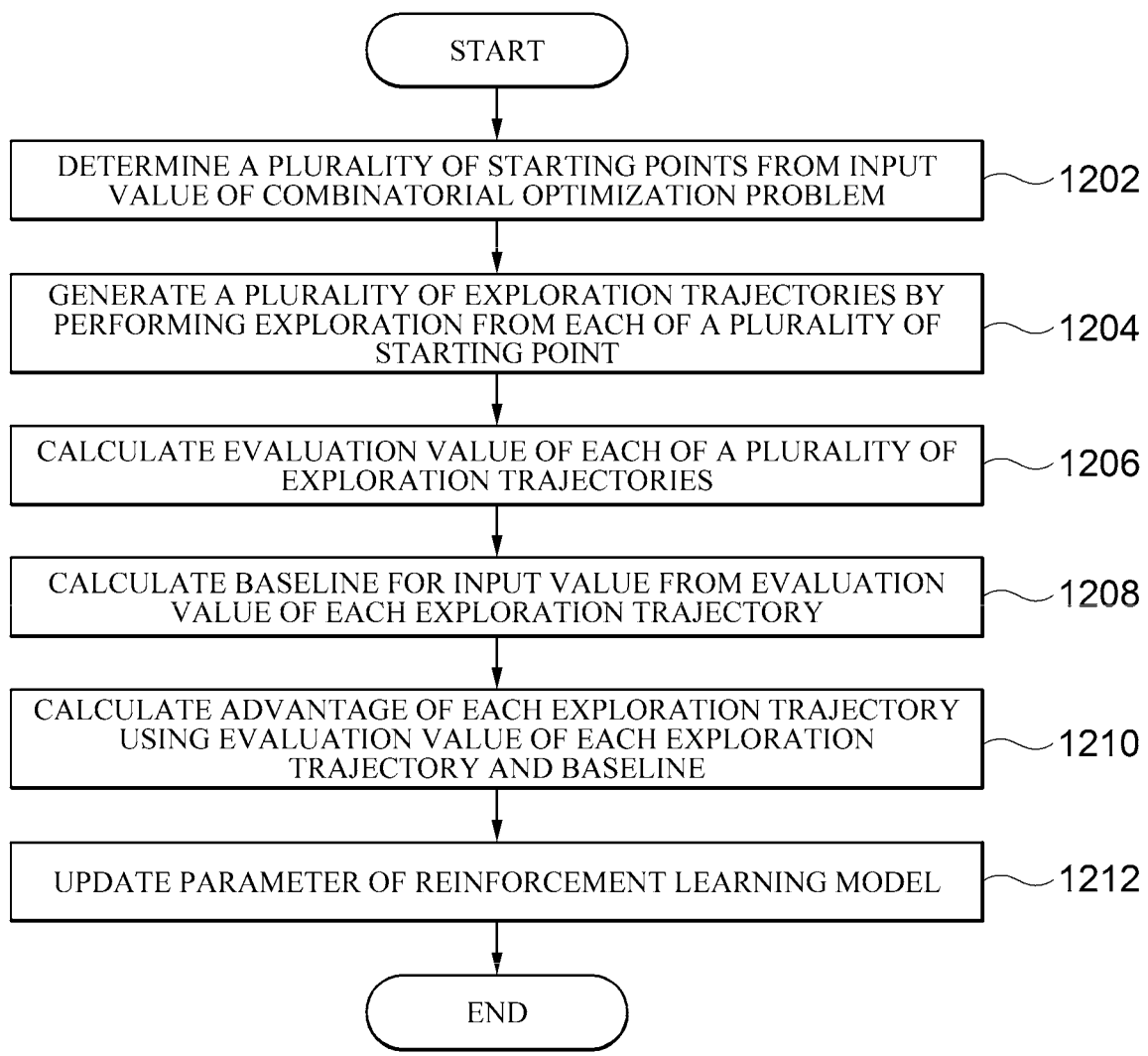
FIG. 12 is a block diagram illustrating a method of training a reinforcement learning model according to one embodiment.

FIG. 12 is a flowchart illustrating a method 1200 of training a reinforcement learning model according to one embodiment. The illustrated flowchart may be performed by a computing device that includes one or more processors and memory storing one or more programs to be executed by the one or more processors, for example, the above-described apparatus 100 for training a reinforcement learning model. In the illustrated flowchart, at least some of the operations may be performed in different order or may be combined into fewer operations or further divided into more operations. In addition, some of the operations may be omitted, or one or more extra operations, which are not illustrated, may be added to the flowchart and be performed.

In operation 1202, the starting point determinator 102 of the apparatus 100 for training a reinforcement learning model determines a plurality of starting points from an input value of a combinatorial optimization problem.

In operation 1204, the multi-explorer 104 generates a plurality of exploration trajectories by performing exploration from each of the plurality of starting points using a reinforcement learning model.

In operation 1206, the trajectory evaluator 106 calculates an evaluation value of each of the plurality of exploration trajectories using an evaluation function of the combinatorial optimization problem.

In operation 1208, the baseline calculator 108 calculates a baseline for the input value from the evaluation value of each exploration trajectory.

In operation 1210, the advantage calculator 110 computes an advantage of each exploration trajectory using the evaluation value of each exploration trajectory and the baseline.

In operation 1212, the parameter updater 112 updates parameters of the reinforcement learning model using the plurality of exploration trajectories and the exploration trajectory-specific advantages.

Figure 13:
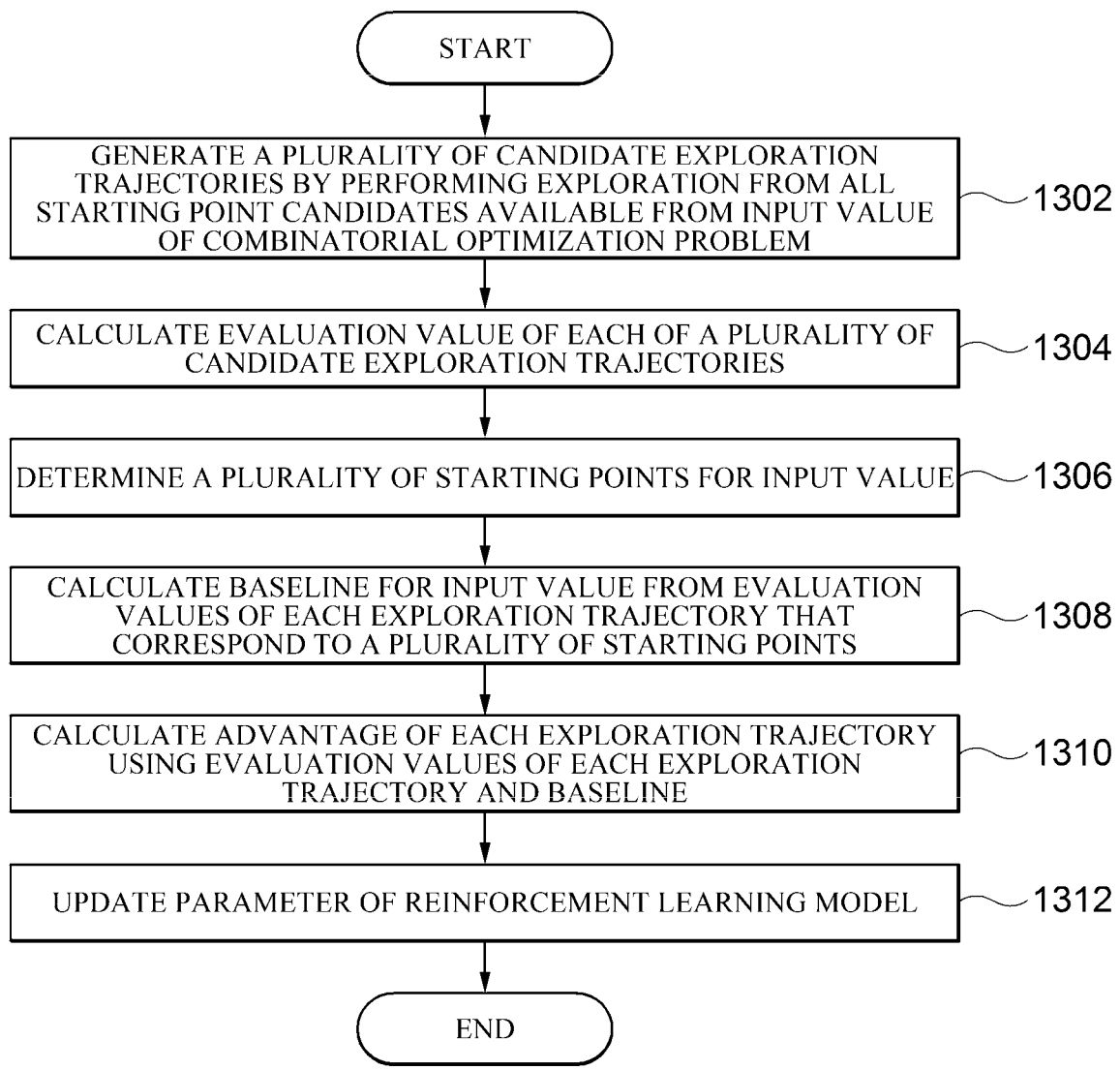
FIG. 13 is a block diagram illustrating a method of training a reinforcement learning model according to another embodiment.

FIG. 13 is a flowchart illustrating a method 1200 of training a reinforcement learning model according to another embodiment. The illustrated flowchart may be performed by a computing device that includes one or more processors and memory storing one or more programs to be executed by the one or more processors, for example, the above-described apparatus 900 for training a reinforcement learning model. In the illustrated flowchart, at least some of the operations may be performed in different order or may be combined into fewer operations or further divided into more operations. In addition, some of the operations may be omitted, or one or more extra operations, which are not illustrated, may be added to the flowchart and be performed.

In operation 1302, for all starting point candidates available from an input value of a combinatorial optimization problem, the multi-explorer 902 of the apparatus 900 for training a reinforcement learning model generate a plurality of candidate exploration trajectories by performing exploration from each of all the possible starting point candidates using the reinforcement learning model.

In operation 1304, the trajectory evaluator 904 calculates an evaluation value of each of the plurality of candidate exploration trajectories using an evaluation function of the combinatorial optimization problem.

In operation 1306, the starting point determinator 906 determines a plurality of starting points for the input value by using the evaluation values of the plurality of respective candidate exploration trajectories.

In operation 1308, the baseline calculator 108 calculates a baseline for the input value from evaluation values of a plurality of exploration trajectories that correspond to the plurality of respective starting points.

In operation 1310, the advantage calculator 110 computes an advantage of each of the plurality of exploration trajectories using the evaluation values of the plurality of respective exploration trajectories and the baseline.

In operation 1312, the parameter updater 112 updates parameters of the reinforcement learning model by using the plurality of exploration trajectories and the exploration trajectory-specific advantages.

Figure 14:
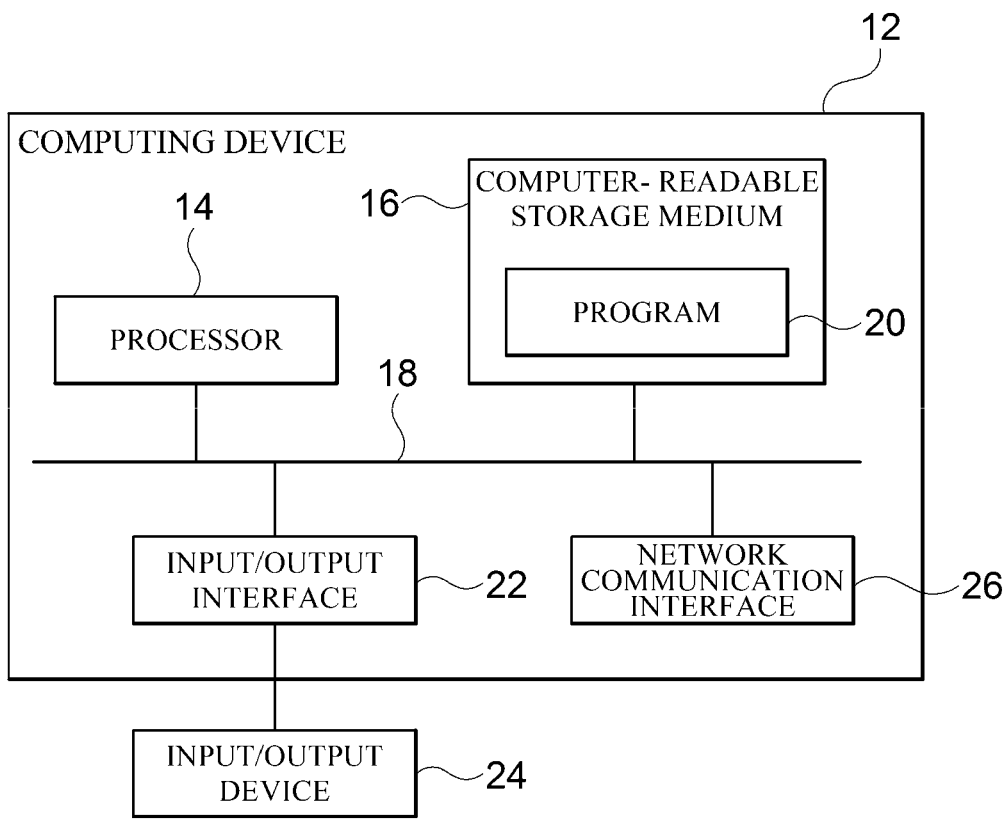
FIG. 14 is a block diagram illustrating an example of a computing environment including a computing device suitable for use in exemplary embodiments.

FIG. 14 is a block diagram illustrating an example of a computing environment 10 including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one exemplary embodiment, the computing device 12 may be any one of the apparatuses 100, 700, 800, and 900 for retraining a reinforcement learning model according to the disclosed embodiments. The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiment, by effectively training a reinforcement learning model for use in combinatorial optimization, it is possible to improve the accuracy and processing speed of the reinforcement learning model.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for training a reinforcement learning model, the apparatus comprising:
    a starting point determinator configured to determine a plurality of starting points from an input value of a combinatorial optimization problem;
    a multi-explorer configured to generate a plurality of exploration trajectories by performing exploration from each of the plurality of starting points using a reinforcement learning model;
    a trajectory evaluator configured to calculate an evaluation value of each of the plurality of exploration trajectories using an evaluation function of the combinatorial optimization problem;
    a baseline calculator configured to calculate a baseline for the input value from evaluation values of the plurality of exploration trajectories;
    an advantage calculator configured to calculate an advantage of each of the plurality of exploration trajectories by subtracting the baseline from the evaluation value of each of the plurality of exploration trajectories; and
    a parameter updater configured to update parameters of the reinforcement learning model by using the plurality of exploration trajectories and advantages of the plurality of exploration trajectories.

2. The apparatus of claim 1, wherein the starting point determinator is configured to infer an optimal trajectory for all starting point candidates available from the input value by using the reinforcement learning model and determine the plurality of starting points among the starting point candidates based on an inference value of each of the starting point candidates.

3. The apparatus of claim 1, wherein the evaluation value of each of the plurality of exploration trajectories is calculated as a sum of rewards computed for each of the plurality of exploration trajectories.

4. The apparatus of claim 1, wherein the baseline calculator is configured to calculate the baseline using one of an average and median value of the evaluation values of the plurality of respective exploration trajectories, an evaluation value of a specific ranking, an average of evaluation values of a specific ranking or higher, and a median value of evaluation values of a specific ranking or higher.

5. The apparatus of claim 1, further comprising an input value extender configured to generate one or more extended input values from the input value, wherein the one or more extended input values are generated by modifying the input value such that an evaluation value of an optimal solution of an extended input value is equal to an evaluation value of an optimal solution of the input value.

6. The apparatus of claim 5, wherein the starting point determinator is configured to receive the input value and the one or more extended input values at the same time and generate a plurality of starting points from the received values and the baseline calculator is configured to receive an evaluation value of each exploration trajectory derived from the input value and an evaluation value of each exploration trajectory derived from the extended input value and calculate one baseline from the received evaluation values.

7. The apparatus of claim 1, wherein the starting point determinator is configured to simultaneously receive a plurality of different input values and generate a plurality of starting points from the received input values and the baseline calculator is configured to calculate a plurality of different baselines for the different respective input values.

8. An apparatus for training a reinforcement learning model, comprising:
    a multi-explorer configured to generate a plurality of candidate exploration trajectories from all starting point candidates available from an input value of a combinatorial optimization problem by performing exploration from each of all the starting point candidates;
    a trajectory evaluator configured to calculate an evaluation value of each of the plurality of candidate exploration trajectories using an evaluation function of the combinatorial optimization problem;
    a starting point determinator configured to determine a plurality of starting points for the input value by using the evaluation value of each of the plurality of candidate exploration trajectories;
    a baseline calculator configured to calculate a baseline for the input value from evaluation values of a plurality of exploration trajectories that respectively correspond to the plurality of starting points;
    an advantage calculator configured to calculate an advantage of each of the plurality of exploration trajectories by subtracting the baseline from the evaluation value of each of the plurality of exploration trajectories; and
    a parameter updater configured to update parameters of the reinforcement learning model by using the plurality of exploration trajectories and advantages of the plurality of exploration trajectories.

9. The apparatus of claim 8, wherein the evaluation value of each of the plurality of exploration trajectories is calculated as a sum of rewards computed for each of the plurality of exploration trajectories.

10. The apparatus of claim 8, wherein the baseline calculator is configured to calculate the baseline using one of an average and median value of the evaluation values of the plurality of respective exploration trajectories, an evaluation value of a specific ranking, an average of evaluation values of a specific ranking or higher, and a median value of evaluation values of a specific ranking or higher.

11. The apparatus of claim 8, further comprising an input value extender configured to generate one or more extended input values from the input value, wherein the one or more extended input values are generated by modifying the input value such that an evaluation value of an optimal solution of an extended input value is equal to an evaluation value of an optimal solution of the input value.

12. The apparatus of claim 11, wherein the multi-explorer is configured to receive the input value and the one or more extended input values at the same time and generate a plurality of candidate exploration trajectories from the received values and the baseline calculator is configured to receive an evaluation value of each exploration trajectory derived from the input value and an evaluation value of each exploration trajectory derived from the extended input value and calculate one baseline from the received evaluation values.

13. The apparatus of claim 8, wherein the multi-explorer is configured to simultaneously receive a plurality of different input values and generate a plurality of candidate exploration trajectories from the received input values and the baseline calculator is configured to calculate a plurality of different baselines for the different respective input values.

14. A method of training a reinforcement learning model, which is performed by a computing device that includes one or more processors and memory storing one or more programs to be executed by the one or more processors, the method comprising:
  determining a plurality of starting points from an input value of a combinatorial optimization problem;
  generating a plurality of exploration trajectories by performing exploration from each of the plurality of starting points using a reinforcement learning model;
  calculating an evaluation value of each of the plurality of exploration trajectories using an evaluation function of the combinatorial optimization problem;
  calculating a baseline for the input value from the evaluation values of the plurality of exploration trajectories;
  calculating an advantage of each of the plurality of exploration trajectories by subtracting the baseline from the evaluation value of each of the plurality of exploration trajectories; and
  updating parameters of the reinforcement learning model by using the plurality of exploration trajectories and advantages of the plurality of exploration trajectories.

15. A method of training a reinforcement learning model, which is performed by a computing device that includes one or more processors and memory storing one or more programs to be executed by the one or more processors, the method comprising:
  generating a plurality of candidate exploration trajectories from all starting point candidates available from an input value of a combinatorial optimization problem by performing exploration from each of all the starting point candidates;
  calculating an evaluation value of each of the plurality of candidate exploration trajectories using an evaluation function of the combinatorial optimization problem;
  determining a plurality of starting points for the input value by using the evaluation value of each of the plurality of candidate exploration trajectories;
  calculating a baseline for the input value from evaluation values of a plurality of exploration trajectories that respectively correspond to the plurality of starting points;
  calculating an advantage of each of the plurality of exploration trajectories by subtracting the baseline from the evaluation value of each of the plurality of exploration trajectories; and
  updating parameters of the reinforcement learning model by using the plurality of exploration trajectories and advantages of the plurality of exploration trajectories.

* * * * *